United States Patent
Lopez et al.

(10) Patent No.: US 10,467,198 B2
(45) Date of Patent: Nov. 5, 2019

(54) NETWORK PARTITION TOLERANCE IN A HIGH AVAILABLE CENTRALIZED VCS IMPLEMENTATION

(71) Applicant: Oracle International Corporation, Redwood Shores, CA (US)

(72) Inventors: Jonathan Lopez Lopez, San Mateo, CA (US); Juan Ignacio Vimberg, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 208 days.

(21) Appl. No.: 15/434,513

(22) Filed: Feb. 16, 2017

(65) Prior Publication Data

US 2018/0075057 A1    Mar. 15, 2018

Related U.S. Application Data

(60) Provisional application No. 62/395,232, filed on Sep. 15, 2016, provisional application No. 62/395,341, filed on Sep. 15, 2016.

(51) Int. Cl.

| | |
|---|---|
| *G06F 7/00* | (2006.01) |
| *G06F 16/176* | (2019.01) |
| *G06F 16/14* | (2019.01) |
| *G06F 16/178* | (2019.01) |
| *G06F 16/27* | (2019.01) |
| *G06F 16/23* | (2019.01) |

(52) U.S. Cl.
CPC ........ *G06F 16/1774* (2019.01); *G06F 16/148* (2019.01); *G06F 16/178* (2019.01); *G06F 16/2343* (2019.01); *G06F 16/2379* (2019.01); *G06F 16/275* (2019.01); *G06F 16/278* (2019.01)

(58) Field of Classification Search
CPC ....... G06G 17/30171; G06G 17/30581; G06G 17/30174; G06F 17/30171; G06F 17/30581; G06F 17/30174
USPC .................. 707/611, 638, 690, 695, 999.203
See application file for complete search history.

(56) References Cited

U.S. PATENT DOCUMENTS

| | | | | |
|---|---|---|---|---|
| 5,008,853 A | * | 4/1991 | Bly | ........................ G06Q 10/10 345/2.1 |
| 5,701,480 A | * | 12/1997 | Raz | ......................... G06F 9/466 714/19 |
| 5,933,824 A | * | 8/1999 | DeKoning | ................ G06F 9/52 |

(Continued)

OTHER PUBLICATIONS

TortoiseSVN A Subversion client for Windows; Version 1.7, Stefan Kung, Lubbe Onken, Simon Large; Publication Date Dec. 22, 2011 (Year: 2011).*

*Primary Examiner* — Mohammed R Uddin
(74) *Attorney, Agent, or Firm* — Trellis IP Law Group, PC (57) ABSTRACT

Implementations provide a database lock mechanism used to prevent concurrent writes to service on network partition scenarios associated with a version control system. The database lock mechanism may be provided on per repository basis to ensure both nodes are working and maintaining data consistency, even when they are not connected when interruptions in network communication disrupts the intercommunication between nodes. In other implementations, the disclosed locking mechanism is configured to ensure and perform write and synchronization operations on isolated nodes, regardless of miss-communication between the nodes.

20 Claims, 7 Drawing Sheets

(56) References Cited

U.S. PATENT DOCUMENTS

| | | | | |
|---|---|---|---|---|
| 6,304,873 B1* | 10/2001 | Klein | | G06F 17/30421 |
| 7,437,712 B1* | 10/2008 | Brown | | G06F 8/71 |
| | | | | 717/121 |
| 7,716,182 B2* | 5/2010 | Tewksbary | | G06F 17/30171 |
| | | | | 707/638 |
| 7,945,589 B1* | 5/2011 | Weiss | | G06F 8/71 |
| | | | | 707/795 |
| 8,131,679 B2* | 3/2012 | Watanabe | | G06F 17/30595 |
| | | | | 707/640 |
| 8,346,719 B2* | 1/2013 | Sudhakar | | G06F 17/30067 |
| | | | | 707/610 |
| 8,352,418 B2* | 1/2013 | Bailor | | G06F 17/24 |
| | | | | 707/608 |
| 9,430,541 B1* | 8/2016 | Johnson | | G06F 17/30575 |
| 2002/0065848 A1* | 5/2002 | Walker | | G06F 17/24 |
| | | | | 715/205 |
| 2003/0177481 A1* | 9/2003 | Amaru | | G06F 17/30557 |
| | | | | 717/148 |
| 2003/0217092 A1* | 11/2003 | Veselov | | G06F 9/52 |
| | | | | 718/106 |
| 2004/0133444 A1* | 7/2004 | Defaix | | G06F 8/71 |
| | | | | 717/122 |
| 2005/0114240 A1* | 5/2005 | Watson-Luke | | G06F 9/44505 |
| | | | | 705/34 |
| 2006/0007944 A1* | 1/2006 | Movassaghi | | H04L 41/0813 |
| | | | | 370/401 |
| 2006/0271606 A1* | 11/2006 | Tewksbary | | G06F 17/30132 |
| 2007/0198979 A1* | 8/2007 | Dice | | G06F 9/466 |
| | | | | 718/100 |
| 2009/0240664 A1* | 9/2009 | Dinker | | G06F 12/0842 |
| 2009/0240700 A1* | 9/2009 | Hayashi | | H04L 67/1097 |
| 2009/0271696 A1* | 10/2009 | Bailor | | G06F 16/954 |
| | | | | 715/229 |
| 2009/0282042 A1* | 11/2009 | Russell | | G06F 8/71 |
| 2010/0037216 A1* | 2/2010 | Carcerano | | G06F 8/65 |
| | | | | 717/173 |
| 2012/0297363 A1* | 11/2012 | Perisic | | G06F 8/71 |
| | | | | 717/122 |
| 2014/0236913 A1* | 8/2014 | Chakradhar | | G06F 9/466 |
| | | | | 707/703 |
| 2016/0092526 A1* | 3/2016 | Kothari | | G06F 17/30563 |
| | | | | 707/602 |
| 2016/0154817 A1* | 6/2016 | Mason, Jr. | | G06F 17/30171 |
| | | | | 707/704 |
| 2016/0217177 A1* | 7/2016 | Niikura | | G06F 17/30377 |

* cited by examiner

NETWORK PARTITION TOLERANCE IN A HIGH AVAILABLE CENTRALIZED VCS IMPLEMENTATION

CROSS REFERENCES TO RELATED APPLICATIONS

This application claims priority from U.S. Provisional Patent Application Ser. No. 62/395,232, entitled NETWORK PARTITION TOLERANCE IN A HIGH AVAILABLE CENTRALIZED VCS IMPLEMENTATION, filed on Sep. 15, 2016 (ORACP0178P), and U.S. Provisional Patent Application Ser. No. 62/395,341, entitled SYSTEM FOR PROCESS CLOUD SERVICE, filed on Sep. 15, 2016 (ORACP0192P), which are hereby incorporated by reference as if set forth in full in this application for all purposes.

BACKGROUND

The following relates to data lock mechanisms used in network systems. More specifically the following relates to lock mechanisms used in high availability networks.

Software versioning and revision control system, such as APACHE Subversion (SVN), are file-system based source control systems used to maintain current and historical versions of data files such as source code, web pages, documentation, etc. Backup mechanisms are used to backup the SVN repository into the database and distribute the SVN repository across nodes in the cluster. However, since current versioning and revision control system programs rely on fixed quorum policies, such mechanisms are often ineffective in maintaining synchronous versions of distributed node clusters.

Adding network partitions increases the complexity as such current versioning and revision control system programs often not capable of effectively working with node clusters distributed across partitions, resulting in potential inconsistencies in the repository. The problem is further exacerbated with multiple nodes working in parallel and processing new information on the same assets, especially in high availability environments, where providing the latest info and data consistency is often a top priority.

In the case of a 2-node configuration, if there is a network partition (i.e. both nodes are active but cannot see each other) then each of the nodes is able to write, regardless on what's happening on the other node. When concurrent writes are successful the history of the repositories often diverges. Unfortunately, when the repositories diverge, merging the repositories using current versioning and revision control system programs often becomes a highly complex problem that usually involves human interaction, which because of the complexity and difficulty in determining what changes between the divergent repositories should and should not be merged, may break the space when a corruption occurs rendering services unavailable.

Therefore, a new and improved method and system for locking data in network systems is desired.

SUMMARY

Implementations described herein provide a database lock mechanism configured to prevent concurrent writes to service on network partition scenarios associated with a version control system. In some implementations, the lock mechanism may be provided on per repository basis to ensure nodes associated with the repository are working and maintaining data consistency even when they are not connected when interruptions in network communication occur that disrupt intercommunication between nodes. In other implementations, the disclosed database lock mechanism is configured to perform write operations and sync functions on isolated nodes, regardless of miss-communication between the nodes.

An implementation provides a computer implemented method for receiving at a first node of a system containing a plurality of nodes, an action for changes to a file that is common to at least a second node and stored in a database locked from allowing changes to the file by a database lock, wherein the first node and the second node are isolated by a network partition and analyzing attributes of the action to determine whether the action received is required to update the file. In response to determining that the action is required to update the file, determining from a data repository whether a database update action is set as unlocked. If the database update action is set as unlocked then querying the data repository associated with the first node to determine revision information pertaining to the file and determining from the revision information whether the file is a latest revision associated with required changes to the file. If the file is the latest revision, then unlocking the data repository and committing the changes to the data repository. In response to committing the changes to the data repository, updating the revision of the file in the data repository based on the changes, and in response to committing the changes to the data repository and updating the revision of the data repository, releasing the database lock and updating the file with the changes.

In one implementation, to avoid corruption between repositories that often maintain their own revision information, a database lock mechanism employs a table configured to maintain locking information and correct revisions for one or more repositories. As such, to prevent repository corruption in partitioned systems, the database lock mechanism in conjunction with the table may be deployed as an interface layer configured to act as a safeguard on top of, or as part of, other database tables and functions, such that only one node in a cluster will be allowed to publish a latest revision.

In an implementation, to prevent inconsistencies that can occur when network partitions are employed, a lock mechanism compares a local SVN repository on a file system (FS) to its version in the DB and is updated. In other implementations, an option is provided to synchronize SVN commits with DB updates or asynchronously update the repository in the DB.

A further understanding of the nature and the advantages of particular embodiments disclosed herein may be realized by reference of the remaining portions of the specification and the attached drawings.

DETAILED DESCRIPTION OF EMBODIMENTS

Figure 1:
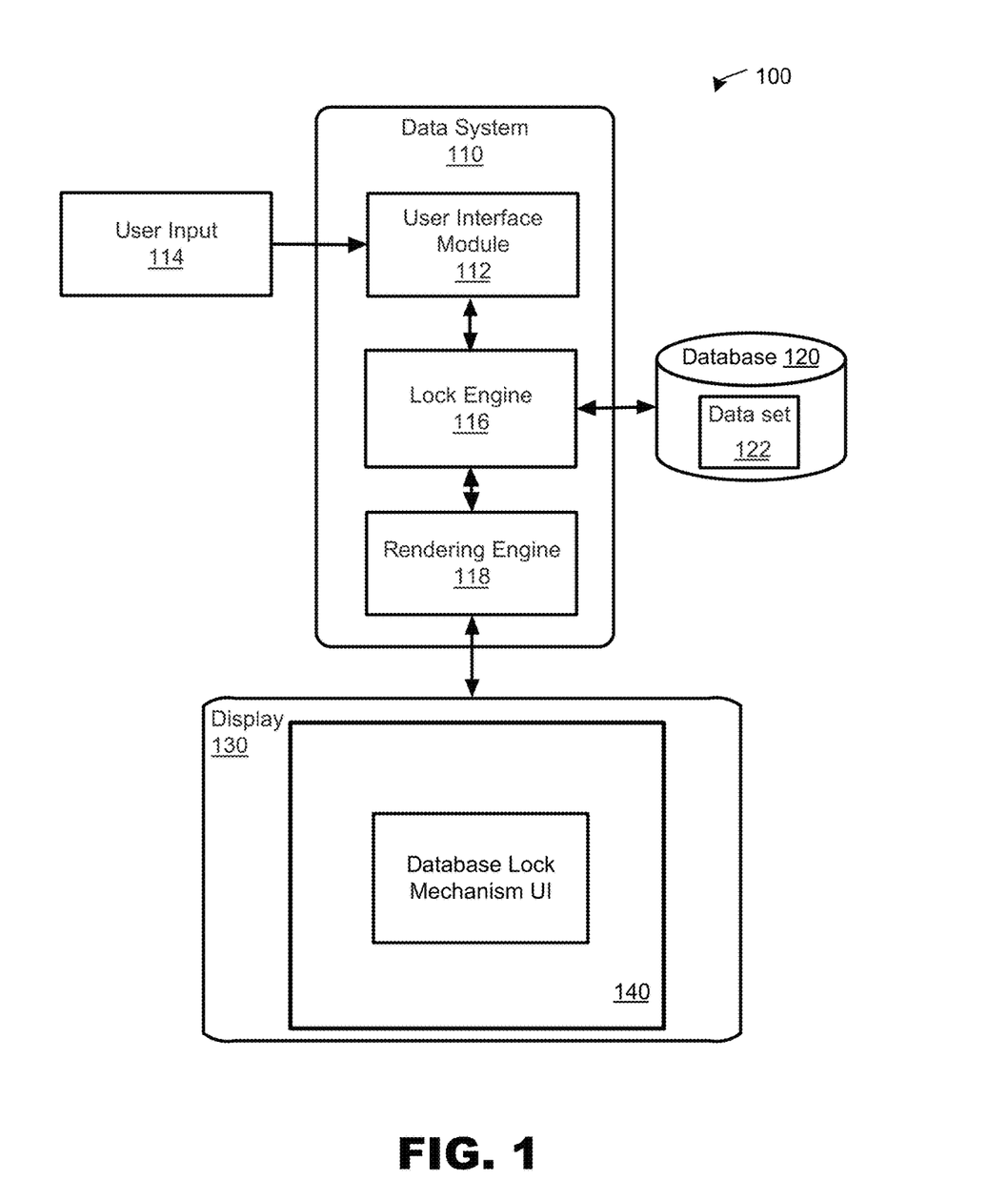
FIG. 1 is a high level illustration of a database lock mechanism.

FIG. 1 is a high-level block diagram of an exemplary computing system 100 for providing a database lock mechanism. Computing system 100 may be any computing system, such as an enterprise computing environment, client-server system, and the like. Computing system 100 includes data system 110 configured to process data received from a user interface 114, such as a keyboard, mouse, etc.

Note that the computing system 100 presents a particular example implementation, where computer code for implementing embodiments may be implemented, at least in part, on a server. However, embodiments are not limited thereto. For example, a client-side software application may implement data system 110, or portions thereof, in accordance with the present teachings without requiring communications between the client-side software application and a server.

In one exemplary implementation, data system 110 is connected to display 130 configured to display data 140, for example, to a user thereof. Display 130 may be a passive or an active display, adapted to allow a user to view and interact with graphical data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to convert, model, generate, deploy, and maintain data 140.

In other implementations, computing system 100 may include a data source such as database 120. Database 120 may be connected to the data system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to data attributes, data hierarchy, nodal positions, values, summations, types of charts of visualizations, algorithms, code (e.g., Javascript, JSON, etc.), source, security, hashes, XML, and the like. In addition, data sets 122 may also contain other data, data elements, and information such as metadata, labels, development-time information, run-time information, configuration information, API, interface component information, library information, pointers, and the like.

Data system 110 may include user interface module 112, database lock engine 116, and rendering engine 118. User interface module 112 may be configured to receive and process data signals and information received from user interface 114. For example, user interface module 112 may be adapted to receive and process data from user input associated with data 140 for processing via data system 110.

In an exemplary implementation, database lock engine 116 may be adapted to receive data from user interface 114 and/or database 120 for processing thereof. In one configuration, database lock engine 116 is a software engine configured to receive and process input data from a user thereof pertaining to data 140 from user interface module 114 and/or database 120 in order to generate a database locking mechanism, check local SVN repositories instantiated on a file system against its version in the database, update the SVN repository on the files system, provide options to synchronize SVN commits with database or to asynchronously update a repository in the database, etc.

Database lock engine 116 in other implementations may be configured as a data analysis tool. Such analysis functions may include determining the attributes associated with the data, whether commits are or are not successful, whether actions are required, not required, or informational, determining the type of data, determining the values of the data, determining the relationships to other data, interpreting metadata associated with the data, and the like. For example, database lock engine 116 may be configured to receive and analyze data sets 122 to determine user interface configuration, data processing instructions, data attributes, data hierarchy, nodes, nodal positions within the hierarchy, values, summations, algorithms, source, security, hashes, and the like, associated with data sets 122.

Database lock engine 116 may receive existing data sets 122 from database 120 for processing thereof. Such data sets 122 may include and represent a composite of separate data sets 122 and data elements pertaining to, for example, organizational data, which may include employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to data 140, associated data sets 122, and other data associated with data 140 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122. In one implementation, upon receiving instruction from a user, for example, through user interface 114, rendering engine 118 may be configured to generate a real-time display of interactive changes being made to data 140 by a user thereof.

Figure 2:
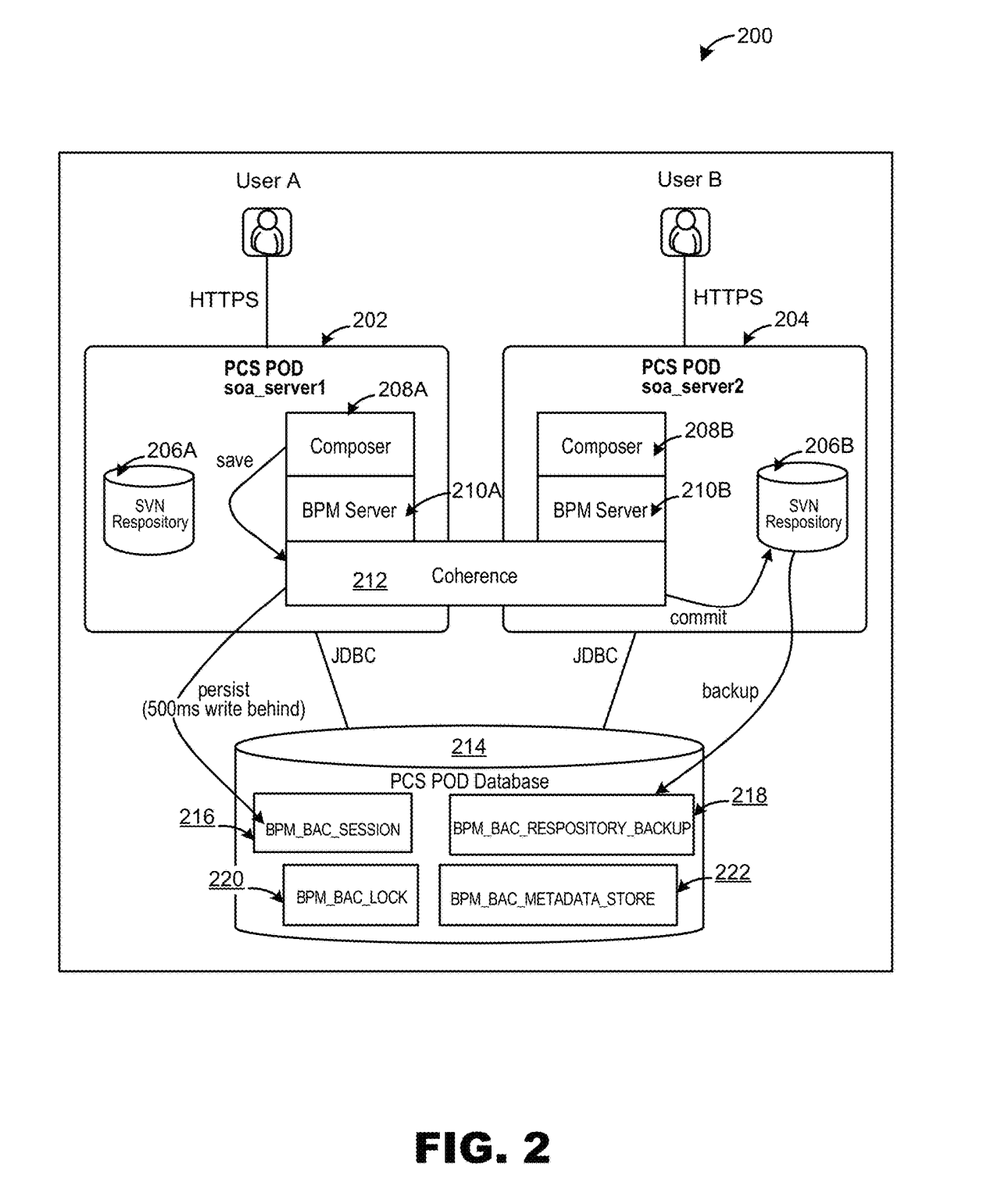
FIG. 2 is an overview of a process asset manager instantiated in a cloud service.

FIG. 2 is an overview of a process asset manager (PAM) 200 instantiated in a database such as database 120, process cloud service (PCS), and the like. In one implementation, PAM 200 includes PCS POD 202A and PCS POD 202B configured to take input from a program 208. As illustrated, PCS POD 202 includes program 208A and PCS POD 204 includes program 208B. Program 208 may be any program that enables any user interface, such as a WebCenter portal, to be customized or personalized after it has been deployed and is in use. For example, program 208 may be ORACLE COMPOSER which is configured to run in all modern browsers and provides a rich, dynamic way to edit JSF application and portal pages by selecting information and components from Business Dictionaries, Resource Catalogues, and the like.

Here, a user A, inputs data to PCS POD 202A. For example, user A could be a user working on a business process management (BPM) project residing on BPM server 210A. In this implementation, the database lock engine 116 may be configured such that the user has the ability to save projects so that they don't get lost in an editing session (for example when user A leaves the program to do another task, and the http session expires before the user returns).

In some implementations, a "Save" operation is used to save changes made by user A. As part of the save operation, project files are written to a program such as program 212 helps to keep data structures in nodes across the partition in sync.

Similarly, user B, inputs data to PCS POD 202B. For example, user B could be a user working on a BPM project residing on BPM server 210B. In this implementation, the database lock engine 116 may be configured such that the user has the ability to save projects so that they don't get lost in an editing session (for example when user B goes to lunch and the http session expires before he returns).

Program 212 for BPM project files may be configured as a cache, such as a write-behind cache. When the user, (e.g. user A or B) saves the BPM project in program 212, after the project is saved to program 212 it may be persisted in a table 216, for example, table BPM_BAC_SESSION instantiated in a database 120, such as PCS POD database 214.

When the user has finished creating the BPM project (or whenever the user intends to commit the project), the user may commit his work to PAM 200 so that it becomes available for other users to edit. As part of the commit operation, the files stored in table 216, e.g., BPM_BAC_SESSION, may be considered and committed to the SVN repository 206 in the database 214. After the SVN repository 206 is updated the data may be removed from table 216.

When SVN repository 206 has been updated through for example, a commit operation, database lock engine 116 may create a backup of some or the entire repository in the database 214. For example, the backup may be persisted in database table 218, e.g., BPM_BAC_REPOSITORY_BACKUP. Database lock engine 116, may also create database table 220, e.g., BPM_BAC_REPOSITORY_LOCK configured to store data such as the repository uuid, latest revision, etc. In one configuration, table 220 may be consulted multiples times during the locking process as described herein, and may be used as a data source of the true revision of a repository. Additionally, a metadata table 222, e.g., BPM_BAC_METADATA_STORE, may be created in order to store basic information about a server configuration such as topology, address, ports, etc.

Figure 3:
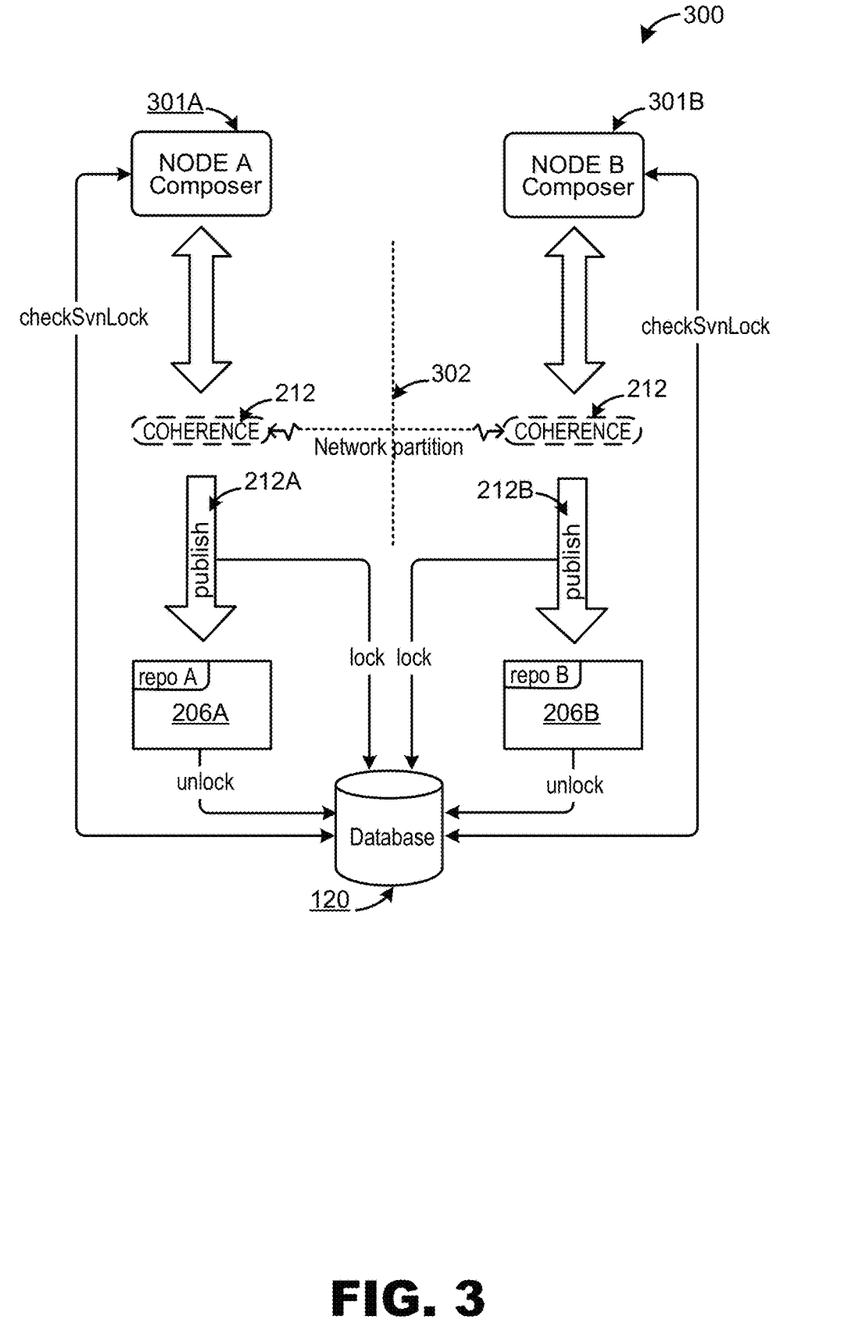
FIG. 3 is a flow diagram for an implementation of a database lock mechanism.

FIG. 3 is a flow diagram for an implementation of database lock mechanism 116. In one implementation, database lock engine 116 may be implemented as an instantiation in database 120 to avoid the issue of network partitions. In some scenarios, when the application has no connection to the database 120 that changes to the database are isolated only to the database as illustrated in FIG. 3. So in the case of a network partition, database lock engine 116 guarantees that only accessible nodes in the cluster would be able to update the repository.

For example, as shown in FIG. 3, Node 301A, and Node 301B are separated by a network partition 302. User A of node 301A and user B of node 301B are able to operate on the same database structure using a database synchronizing program 212, such as COHERENCE, to keep them in sync. Changes, for example, are published at 212 for each user A and B. Such changes are stored in repository 206A and 206B accordingly. Database lock engine 116 locks database 120 at each action, and if the changes are accepted, database lock engine 116 unlocks database 120 to allow changes to be committed.

Thus, database lock engine 116 may be configured to lock actions, such as commits, from occurring that are associated with the SVN repository 206A or 206B. In this configuration, database lock engine 116 prevents inconsistencies due to errors caused by or associated with network partition 302, provides a mechanism to check local SVN repositories 206A and/or 206B on filesystem against its version in the database 122, updates the SVN repository on 214, and provides an option to synchronize actions such as SVN commits with database update of repository or to asynchronously update the repository in the database 122. As such, by controlling which changes are being committed and saved, database lock engine 116 improves processor function and network efficiency by preventing program 212 from storing unnecessary or redundant changes.

In order to further preserve processing function associated with local data processing and/or remote processing over the network, database lock engine 116 may be configured to analyze the changes in real time to determine whether to accept, reject, or ignore changes to be committed relative to each user, e.g., user A and user B, working on the file. In this configuration, database lock engine 116 analyzes the type of change to determine whether a change to be committed is required, is not required, or is informational, i.e. where it does not affect the contents of the file.

In some implementations, database lock engine 116 may be configured to determine whether to save such changes relative to a variable level. For example, database lock engine 116 may determine that all or some of the required changes should be saved and synchronized, but all or some changes that are not required and informational may be rejected, some or all required changes and/or changes that are not required should be saved, but changes that are informational should be ignored, and combinations thereof.

For example, consider the caser where user A is using a program such as COMPOSER on node 301A and sets the program to auto save and/or periodically saves the file regardless of whether changes have been made to the underlying data. During this mode, database lock engine 116 may synchronize substantive changes, e.g., actual changes to a file, document, database entry, etc., synchronize or reject innocuous changes, e.g., changes to the document that do not change its substantive content, or synchronize or reject changes that do not affect the document which may be informational, such as a time stamp on the file.

In one scenario, database lock engine 116 creates a lock table as described herein which is stored, for example, in table 220. The lock table is configured to maintain locking information about one or more SVN repositories, such as SVN repositories 206A or 206B.

Figure 4:
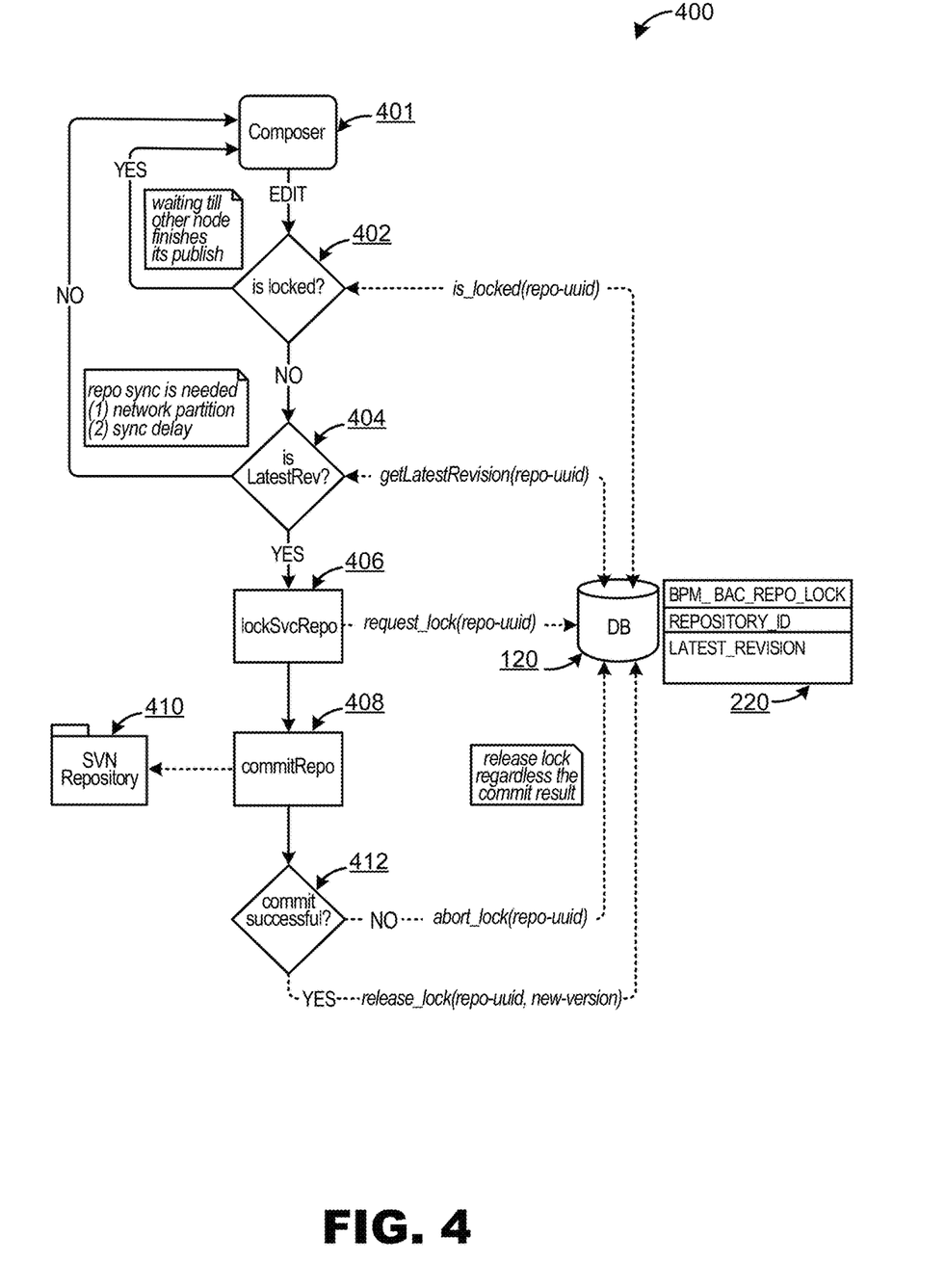
FIG. 4 is a high level flow diagram of a mechanism to prevent a node opening an editing session.

FIG. 4 is a high level flow diagram of a method 400 employing database lock engine 116 configured to prevent a node from opening an editing session. As further illustrated in FIG. 4, in some implementations, a simplified version of the algorithm may be:

1. IF (myRev>=BPM_BAC_REPO_LOCK.LATEST_REVISION) THEN BPM_PAM.request_lock(BPM_BAC_REPO_LOCK.REPOSITORY_UUID)
2. Commit changes to SVN
3. IF (2 was successful) Update BPM_BAC_REPO_LOCK.LATEST_REVISION SET BPM_BAC_REPO_LOCK.LATEST_REVISION= myRevision WHERE BPM_BAC_REPO_LOCK.REPOSITORY_UUID= myRepositoryId
4. BPM_PAM.release_lock(BPM_BAC_REPO_LOCK.REPOSITORY_UUID)

At 401, when an action, such as edit, is initiated, method 400 at 402 checks whether the action is locked, for example, by interrogating database 120. If yes, then method 400 returns to 401. However, if not, method 400 at 404 checks to see of the action is associated with the latest revision of the BPM project, for example, by querying lock table 220 instantiated in database 120. If no, then method 400 returns to 401. If yes, then at 406 method 400 requests lock.

In some implementations at 404, method 400 may query a plurality of attributes of the lock table to determine whether the revision of the project is the latest revision. For example, database lock engine 116 may analyze a plurality or set of attributes and data such as version numbers, types of changes, date stamps, file sizes, read/write history, and the like to discern a "latest" or desired revision. As such, database lock engine 116 may rely on a more comprehensive set of data to determine project revision than, for example, a single data point such as a revision number.

AT 408, method 400 stores actions, such as commit actions, to SVN repository 410. At 412, if the actions are successfully committed to SVN repository 410, the lock is released so that database 120 may be updated. If no, the lock release request is aborted.

Thus, database lock engine 116 acts as a safe guard ensuring that only one node will be able to publish the latest revision (e.g., LATEST_REVISION+1) and hence will prevent repository corruption.

Figure 5:
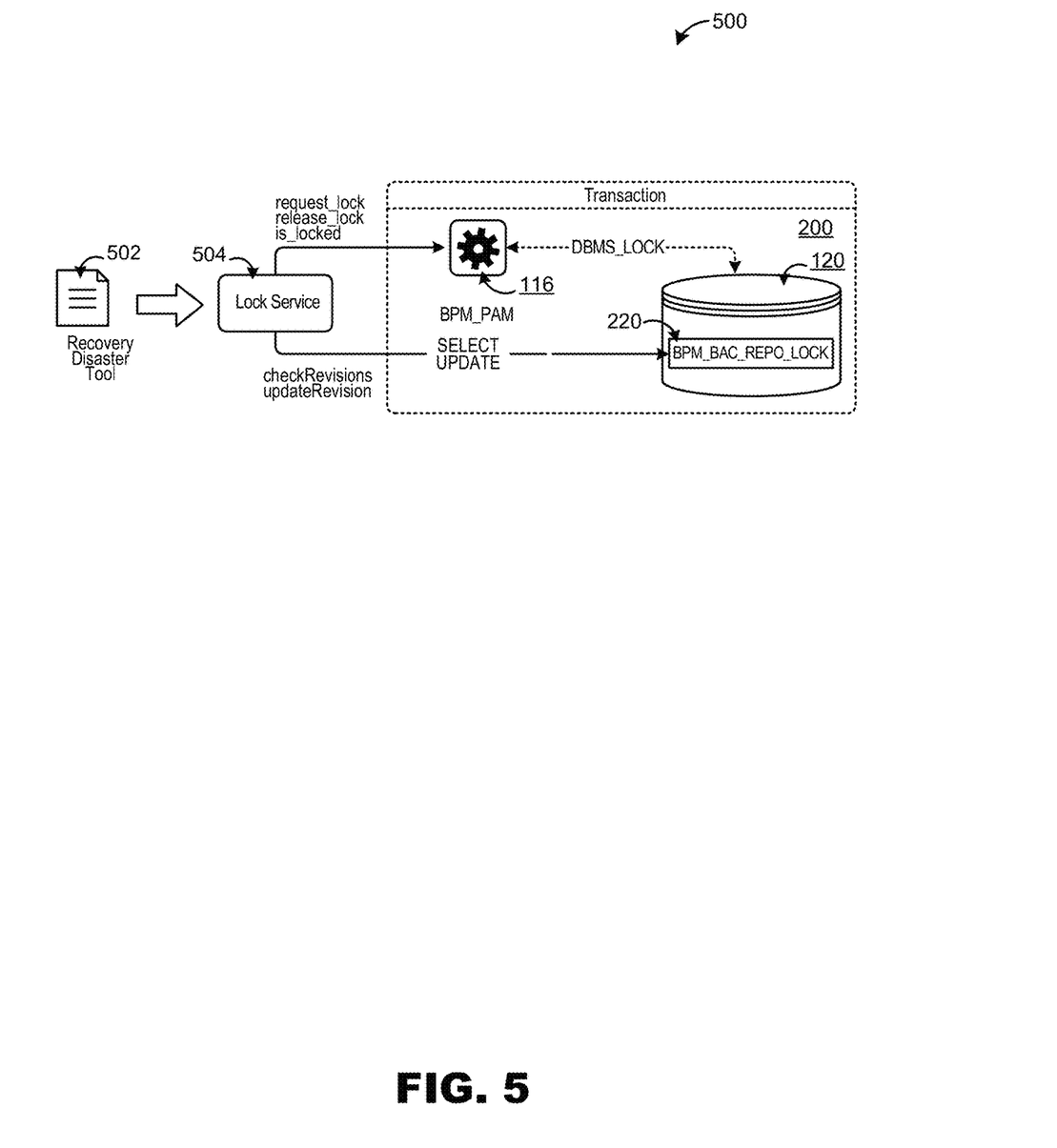
FIG. 5 is a high level representation of a disaster recovery tool.

FIG. 5 is a high-level illustration of a database recovery tool 500. Database recovery tool 500 includes a recovery disaster tool 502 that is configured to ensure that if a failure occurs then a user, such as an administrator, may be allowed to use the database recovery disaster tool 502 to initiate a service 504 pertaining to a transaction associated with, for example, PAM 200. Service 504 may be configured to selects updates from lock table 220 instantiated in database 120, and initiate database lock engine 116 to apply a lock, e.g., Database Management System Lock (DBMS_LOCK). For example, recovery disaster tool 504 may be configured to perform functions such as releasing a lock and updating project repositories to the latest revision, abort a project repository update by releasing a lock while not updating the latest revision of the project repository, determining whether the project is locked or not locked, determining the latest project revision, and the like.

Figure 6:
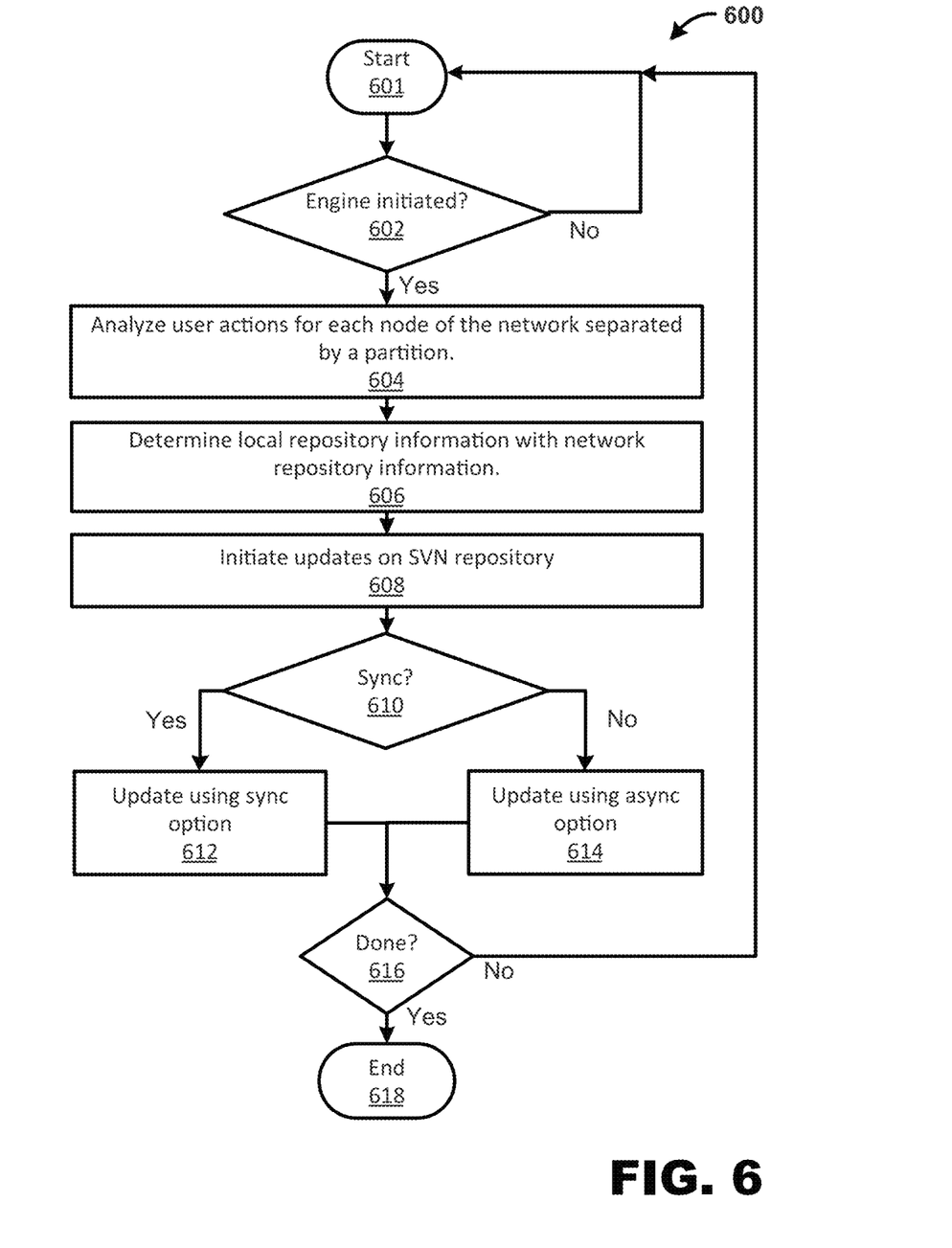
FIG. 6 is a flow diagram of an example method adapted for use with implementations, and variations thereof, illustrated in FIGS. 1-5.

FIG. 6 is a flow diagram of an example method adapted for use with implementations, and variations thereof, illustrated in FIGS. 1-5. Method 600 is entered into for example at 601 when data system 110 is initiated. At 602. Method 600 determines is database lock engine 116 has been initiated. If no, method 600 returns to 601. If yes, then method 600 proceeds to 604 to analyze user actions for each node separated by a network partition. At 606, local repository information related to each node is determined. At 608, the SVN repository for each node is updated. If at 610, a sync option is selected, then updates at 608 are synchronously updated. If at 610, a sync option is not selected then method proceeds to 614 to update the repositories asynchronously. At 616, if the update is done, method 600 ends at 618, if not, method 600 returns to 601.

Figure 7:
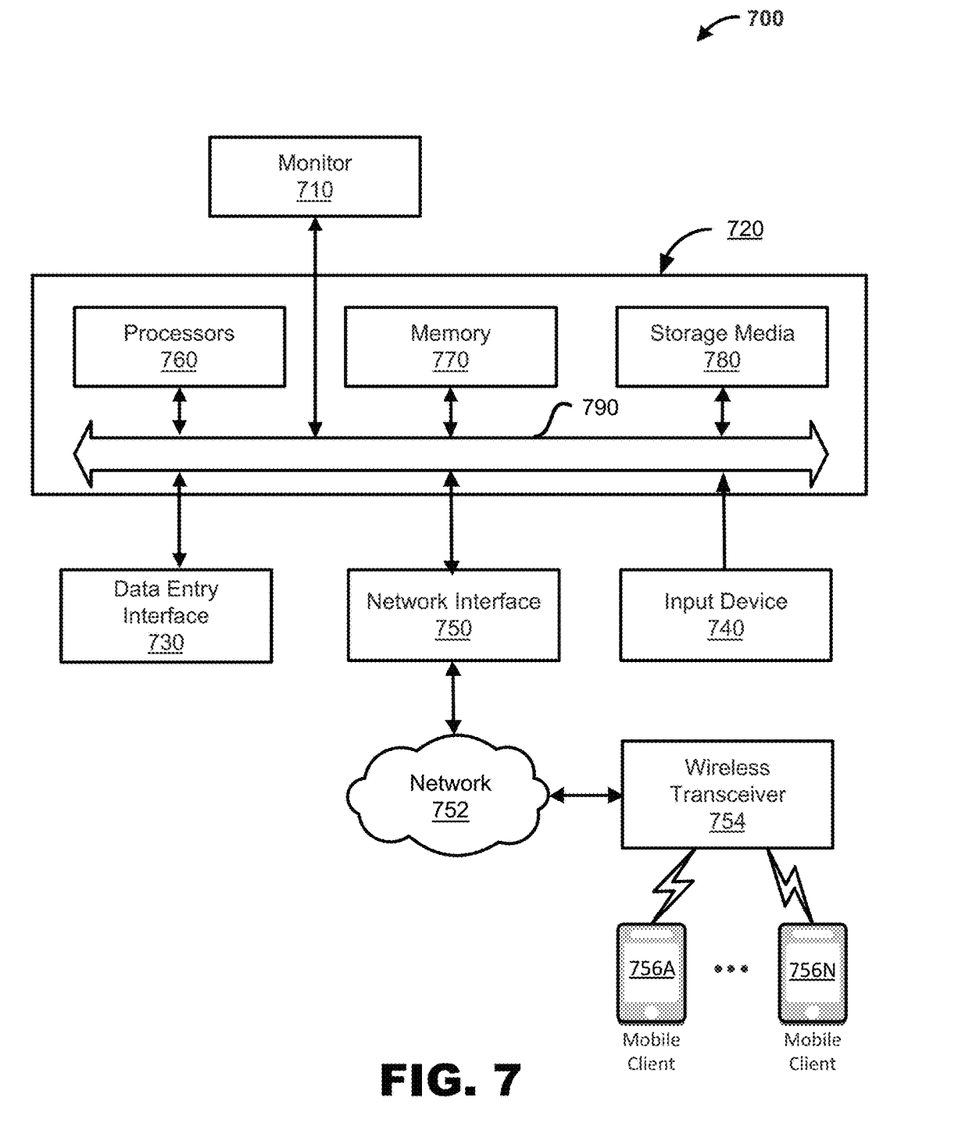
FIG. 7 is a high-level block diagram of an exemplary computer and communication system.

FIG. 7 is a block diagram of an exemplary computer system 700 for use with implementations described in FIGS. 1-5. Computer system 700 is merely illustrative and not intended to limit the scope of the claims. One of ordinary skill in the art would recognize other variations, modifications, and alternatives. For example, computer system 700 may be implemented in a distributed client-server configuration having one or more client devices in communication with one or more server systems.

In one exemplary implementation, computer system 700 includes a display device such as a monitor 710, computer 720, a data entry device 730 such as a keyboard, touch device, and the like, a user input device 740, a network communication interface 750, and the like. User input device 740 is typically embodied as a computer mouse, a trackball, a track pad, wireless remote, tablet, touch screen, and the like. Moreover, user input device 740 typically allows a user to select and operate objects, icons, text, characters, and the like that appear, for example, on the monitor 710.

Network interface 750 typically includes an Ethernet card, a modem (telephone, satellite, cable, ISDN), (asynchronous) digital subscriber line (DSL) unit, and the like. Further, network interface 750 may be physically integrated on the motherboard of computer 720, may be a software program, such as soft DSL, or the like.

Computer system 700 may also include software that enables communications over communication network 752 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 752 may include a local area network, a wide area network, a wireless network, an Intranet, the Internet, a private network, a public network, a switched network, or any other suitable communication network, such as for example Cloud networks. Communication network 752 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 typically includes familiar computer components such as one or more processors 760, and memory storage devices, such as a memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with the present invention.

Memory 770 and Storage media 780 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive. Further details of embodiments may be found in the attached documents provided with this application.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:
   receiving at a first node of a system containing a plurality of nodes, an action providing requested changes to a file that is common to at least a second node and stored in a database locked from allowing changes to the file by a database lock, wherein the first node and the second node are isolated by a network partition;
   analyzing attributes of the action to determine whether the action received is required to update the file;
   analyzing the requested changes to the file to determine substantive changes to the file and changes to the file that do not change substantive content of the file;
   receiving a variable level of the requested changes specifying one or more substantive changes to the file and one or more changes to the file that do not change substantive content of the file, to be accepted or rejected;
   rejecting and accepting the substantive changes to the tile and the changes to the file that do not change substantive content of the tile according to the variable level;
   synchronizing substantive changes to the file and rejecting changes to the file that are informational;
   in response to determining that the action is required to update the file, determining from a data repository whether a database update action is set as unlocked;
   if the database update action is set as unlocked then querying the data repository associated with the first node to determine revision information pertaining to the file;
   determining from the revision information whether the file is a latest revision associated with required changes to the file;
   if the file is the latest revision, then unlocking the data repository; committing the changes to the data repository;
   in response to committing the changes to the data repository, updating the revision of the file in the data repository based on the changes; and
   in response to committing the changes to the data repository and updating the revision of the data repository, releasing the database lock and updating the file with the changes.

2. The computer readable medium of claim 1, wherein the data repository is a SVN repository.

3. The computer readable medium of claim 1, wherein the data repository comprises a local repository associated with the first node.

4. The computer readable medium of claim 1, wherein determining from a synchronization attribute stored in the data repository a data synchronization type used to update the database.

5. The computer readable medium of claim 4, further comprising determining from data synchronization type whether changes to the first node and changes to the second node are synchronously updated in the database.

6. The computer readable medium of claim 4, further comprising determining from the data synchronization type whether changes to the first node and changes to the second node are asynchronously updated in the database.

7. The computer readable medium of claim 1, wherein attributes of the action comprise other attributes indicating the action received is not required to update the file.

8. The computer readable medium of claim 1, wherein attributes of the action comprise other attributes indicating the action received is related to changes to file information.

9. The computer readable medium of claim 1, wherein analyzing attributes of the action further comprises determining whether the requested changes to the file would result in no change to file contents.

10. The computer readable medium of claim 1, wherein determining from the revision information whether the file is the latest revision further comprises analyzing a plurality of data stored in the data repository.

11. A computer implemented method comprising:
    receiving at a first node of a system containing a plurality of nodes, an action providing requested changes to a file that is common to at least a second node and stored in a database locked from allowing changes to the file by a database lock, wherein the first node and the second node are isolated by a network partition;
    analyzing attributes of the action to determine whether the action received is required to update the file;

analyzing the requested changes to the file to determine substantive changes to the file and changes to the file that do not change substantive content of the file;

receiving a variable level of the requested changes specifying one or more substantive changes to the file and one or more changes to the file that do not change substantive content of the file, to be accepted or rejected;

rejecting and accepting the substantive changes to the file and the changes to the file that do not change substantive content of the file according to the variable level;

synchronizing substantive changes to the file and rejecting changes to the file that are informational;

in response to determining that the action is required to update the file, determining from a data repository whether a database update action is set as unlocked;

if the database update action is set as unlocked then querying the data repository associated with the first node to determine revision information pertaining to the file;

determining from the revision information whether the file is a latest revision associated with required changes to the file;

if the file is the latest revision, then unlocking the data repository;

committing the changes to the data repository;

in response to committing the changes to the data repository, updating the revision of the file in the data repository based on the changes; and in response to committing the changes to the data repository and updating the revision of the data repository, releasing the database lock and updating the file with the changes.

12. The method of claim 11, wherein the data repository is a SVN repository.

13. The method of claim 11, wherein the data repository comprises a local repository associated with the first node.

14. The method of claim 11, wherein determining from a synchronization attribute stored in the data repository a data synchronization type used to update the database.

15. The method of claim 14, further comprising determining from data synchronization type whether changes to the first node and changes to the second node are synchronously updated in the database.

16. The method of claim 14, further comprising determining from the data synchronization type whether changes to the first node and changes to the second node are asynchronously updated in the database.

17. The method of claim 11, wherein attributes of the action comprise other attributes indicating the action received is not required to update the file.

18. The method of claim 11, wherein attributes of the action comprise other attributes indicating the action received is related to changes to file information.

19. The method of claim 11, wherein analyzing attributes of the action further comprises determining whether changes to the file would result in no change to file contents.

20. An apparatus for managing database data updates in a computing environment between partitioned systems, the computing environment comprising a data system having one or more computing devices in communication with a software application that executes software configured to provide information accessible to the one or more computing devices, a computing device of the one or more computing devices executing the software to:

receive at a first node of a system containing a plurality of nodes, an action providing requested changes to a file that is common to at least a second node and stored in a database locked from allowing changes to the file by a database lock, wherein the first node and the second node are isolated by a network partition;

analyze attributes of the action to determine whether the action received is required to update the file;

analyze the requested changes to the file to determine substantive changes to the file and changes to the file that do not change substantive content of the file;

receive a variable level of the requested changes specifying one or more substantive changes to the file and one or more changes to the file that do not change substantive content of the file, to be accepted or rejected;

reject and accept the substantive changes to the file and the changes to the tile that do not change substantive content of the file according to the variable level;

synchronize substantive changes to the file and rejecting changes to the file that are informational;

in response to determining that the action is required to update the file, determine from a data repository whether a database update action is set as unlocked;

if the database update action is set as unlocked then querying the data repository associated with the first node to determine revision information pertaining to the file;

determine from the revision information whether the file is a latest revision associated with required changes to the file;

if the file is the latest revision, then unlock the data repository; commit the changes to the data repository;

in response to committing the changes to the data repository, update the revision of the file in the data repository based on the changes; and in response to commit the changes to the data repository and update the revision of the data repository, release the database lock and update the file with the changes.

* * * * *

UNITED STATES PATENT AND TRADEMARK OFFICE
CERTIFICATE OF CORRECTION

PATENT NO. : 10,467,198 B2  
APPLICATION NO. : 15/434513  
DATED : November 5, 2019  
INVENTOR(S) : Lopez et al.

Page 1 of 1

It is certified that error appears in the above-identified patent and that said Letters Patent is hereby corrected as shown below:

In the Drawings

On sheet 2 of 7, in FIG. 2, under Reference Numeral 206A, Line 2, delete "Respository" and insert -- Repository --, therefor.

On sheet 2 of 7, in FIG. 2, under Reference Numeral 206B, Line 2, delete "Respository" and insert -- Repository --, therefor.

On sheet 2 of 7, in FIG. 2, under Reference Numeral 218, Line 1, delete "RESPOSITORY" and insert -- REPOSITORY --, therefor.

In the Claims

In Column 10, Line 1, in Claim 1, delete "tile" and insert -- file --, therefor.

In Column 10, Line 3, in Claim 1, delete "tile" and insert -- file --, therefor.

In Column 12, Line 30, in Claim 20, delete "tile" and insert -- file --, therefor.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*